United States Patent [19]

Brissot et al.

[11] Patent Number: 4,645,938

[45] Date of Patent: Feb. 24, 1987

[54] PROCESS FOR ANALYZING A ROW TRANSFER PHOTOSENSITIVE DEVICE WHILE ACCOMODATING PARASITIC CHARGES

[75] Inventors: Louis Brissot, St. Egreve; Jean-Luc Berger; Yvon Cazaux, both of Grenoble, all of France

[73] Assignee: Thomson - CSF, Paris, France

[21] Appl. No.: 562,443

[22] Filed: Dec. 16, 1983

[30] Foreign Application Priority Data

Dec. 28, 1982 [FR] France .................................. 82 21866

[51] Int. Cl.$^4$ ............................................. H04N 3/14
[52] U.S. Cl. ..................................... 250/578; 358/213
[58] Field of Search ................. 250/578, 211 J, 211 R; 357/30, 31, 32, 24 LR; 358/212, 213

[56] References Cited

U.S. PATENT DOCUMENTS

| | | | |
|---|---|---|---|
| 4,189,749 | 2/1980 | Hiroshima et al. | 358/213 |
| 4,322,753 | 3/1982 | Ishihara | 358/213 |
| 4,450,484 | 5/1984 | Terakawa et al. | 358/213 |
| 4,496,980 | 1/1985 | Pfleiderer et al. | 358/213 |

Primary Examiner—Edward P. Westin
Attorney, Agent, or Firm—Roland Plottel

[57] ABSTRACT

The storage capacity of the photosensitive points is increased during the time interval starting after the evacuation of the parasitic charges from the conductive columns to the memory and finishing by the transfer of signal charges from a row of the columns to the memory. Thus, even the overilluminated photosensitive points do not overflow onto the columns.

5 Claims, 19 Drawing Figures

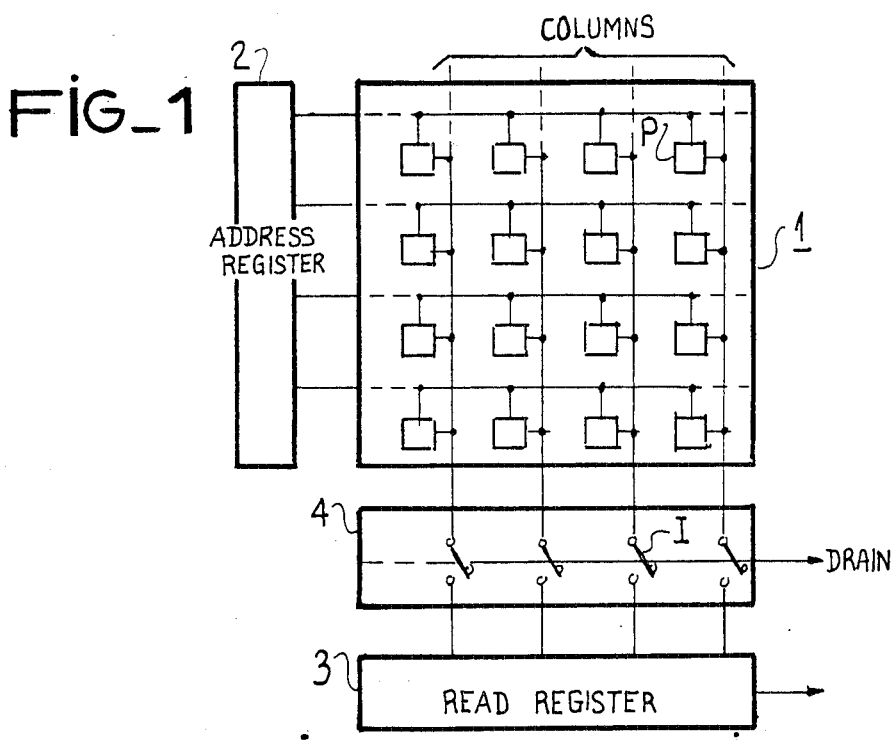
FIG_1
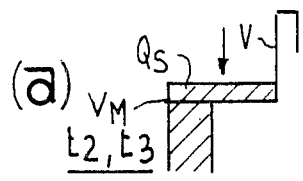
FIG_3
PHOTOSENSITIVE ELEMENT
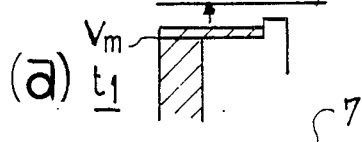
FIG_4
PHOTOSENSITIVE ELEMENT
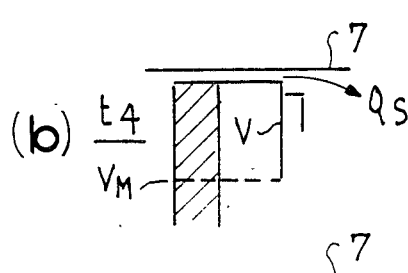
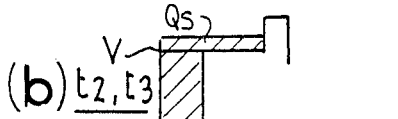
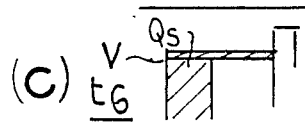
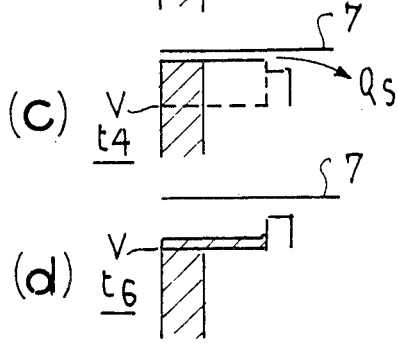

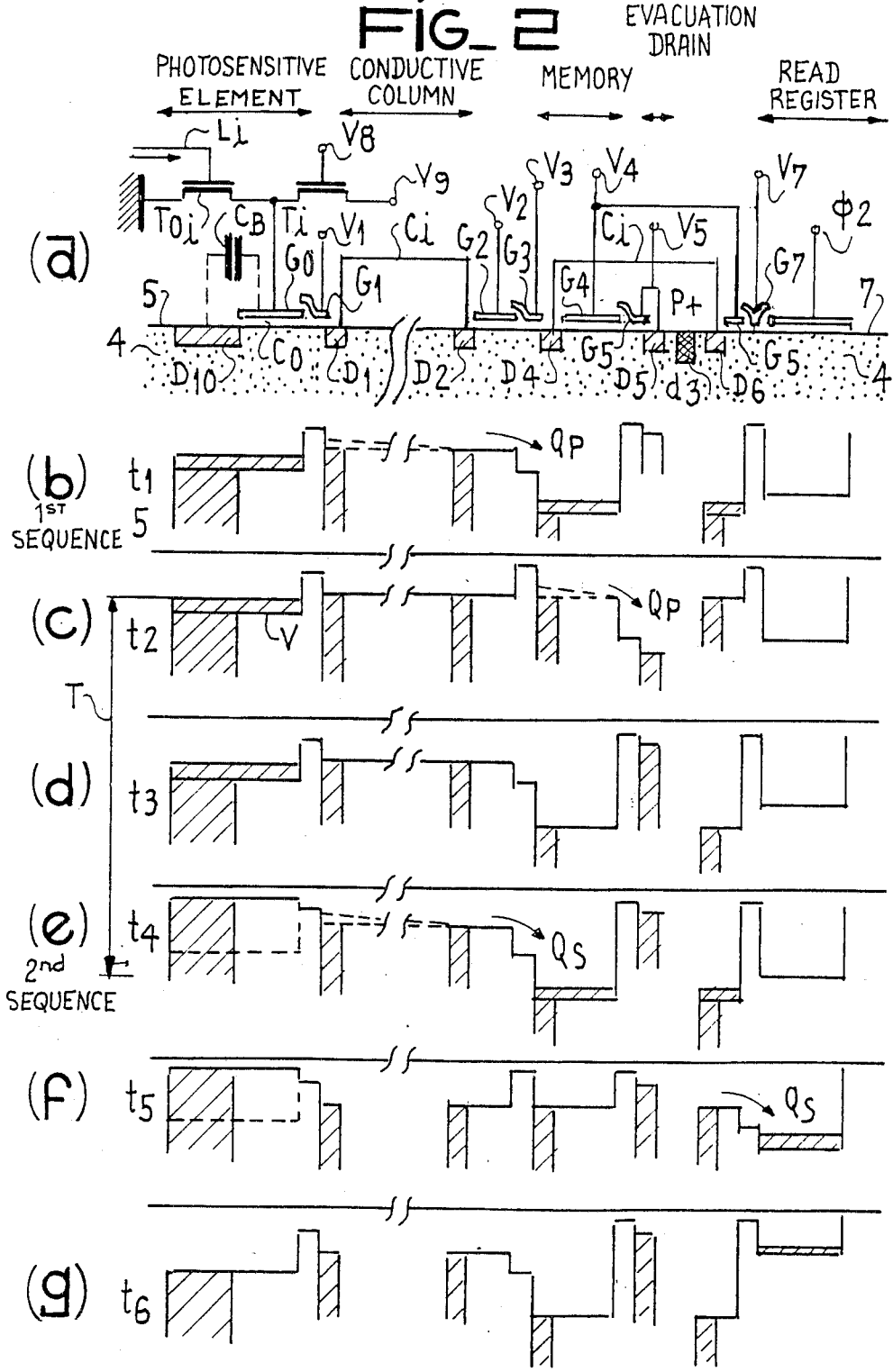

FIG_5
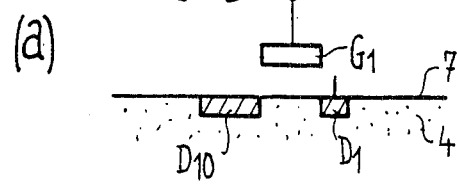
(a) PHOTOSENSITIVE ELEMENT
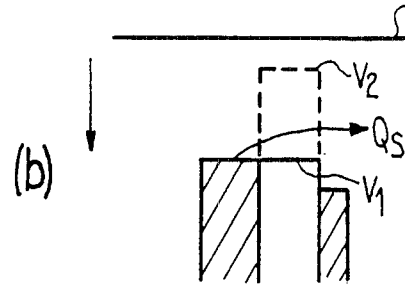
(b)
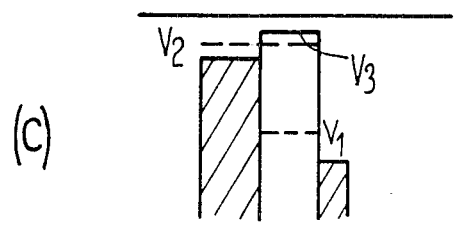
(c)
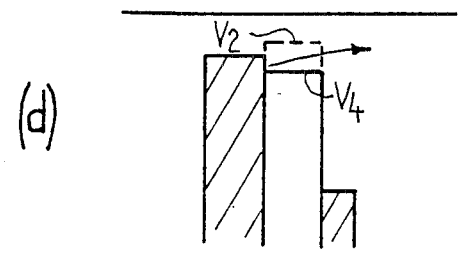
(d)

PROCESS FOR ANALYZING A ROW TRANSFER PHOTOSENSITIVE DEVICE WHILE ACCOMODATING PARASITIC CHARGES

BACKGROUND OF THE INVENTION

1. Field of the Invention

The present invention relates to a process for the analysis of a row transfer photosensitive device.

2. Description of the Prior Art

The prior art and in particular U.S. Pat. Nos. 4,430,672 and 4,506,299 assigned to THOMSON-CSF, discloses photosensitive devices whose analysis takes place by row transfer.

In general, these devices comprise a photosensitive area constituted by M rows of N photosensitive elements each. The photosensitive elements of the different lines are connected in parallel by conductive columns to a memory. This memory periodically ensures the transfer to a read register of the signal charges collected on a row of photosensitive elements and transferred to the columns. Moreover, the memory ensures the transfer to an evacuated drain of the parasitic charges on the columns before the signal charges from one of the rows reaches the columns.

Thus, in row transfer photosensitive devices, there is consequently a periodic repetition of the two following sequences:
- a first sequence corresponding to the transfer to the memory of parasitic charges on the columns, before the signal charges reach the columns;
- a second sequence corresponding to the transfer to the memory of the signal charges from a row on the columns.

The problem is that in the time interval between a first and a second sequence, there is an accumulation on the columns of parasitic charges which are read during the second sequence, at the same time as the signal charges. These parasitic charges are due to smearing and particularly to the overflow of photosensitive elements as a result of too intense illumination and reference is made to the blooming.

It is pointed out that as the photosensitive elements of the different rows are connected in parallel by conductive columns, it is merely necessary to have one too intensely illuminated point which overflows for the column to which this element is connected to receive parasitic charges.

The present invention makes it possible to solve the above problem in a very simple and effective manner.

SUMMARY OF THE INVENTION

The process according to the invention temporarily modifies the storage capacity of the photosensitive elements, in such a way that they can store charges in the time interval starting after the evacuation of the parasitic charges from the conductive columns to the memory and finishing by the transfer of the signal charges from one row of the columns to the memory.

It is possible to increase the storage capacity of the photosensitive elements during this time interval. It is also possible to reduce the storage capacity of the photosensitive elements during the evacuation of the parasitic charges from the conductive columns to the memory and then returning to the normal capacity of the photosensitive elements for the start of said interval.

Thus, during this interval, the photosensitive elements have an adequate capacity to enable them to store the charges. The photosensitive elements are not saturated and do not overflow onto the columns, even if they are bloomed. Thus, there is no deterioration of the quantities of signal charges read as a result of the parasitic charges.

BRIEF DESCRIPTION OF THE DRAWINGS

The invention is described in greater detail hereinafter relative to non-limitative embodiments and with reference to the attached drawings, wherein show:

FIG. 1 the diagram of a prior art photosensitive row transfer device.

FIGS. 2a to g, diagrams illustrating the operation of a prior art device.

FIGS. 3a to c, 4a to d and 5a to d, diagrams illustrating variants of the process according to the invention.

In the different drawings, the same references designate the same elements but, for reasons of clarity, the dimensions and proportions of the various elements have not been respected.

DESCRIPTION OF THE PREFERRED EMBODIMENTS

FIG. 1 is the diagram of a prior art photosensitive row transfer device. FIG. 1 diagrammatically shows a photosensitive area 1, constituted by a matrix of M rows, each having N photosensitive elements P. This area receives the light image to be analyzed and converts it into electrical charges, called signal charges $Q_S$. The photosensitive elements of the same row are connected to one another and to an address register 2, which makes it possible to select the one row in the matrix which is to be read. The photosensitive elements of a column are connected by the same conductive column. The conductive columns lead to a memory 4. This memory has switching means symbolized by the switches I and conduct charges located on the conductive columns either to an evacuation drain, or to a read register 3. The memory ensures the transfer periodically to the read register of the signal charges collected on a row of photosensitive elements by the respective conductive columns. Moreover, the memory periodically ensures the transfer to an evacuation drain of the parasitic charges on the columns, before the signal charges from any of the rows reach the columns.

FIGS. 2a to g are diagrams illustrating the operation of a prior art device. They are described in great detail in U.S. Pat. No. 4,430,672, to which reference should be made if necessary. It is merely pointed out that FIG. 2a is a longitudinal sectional view of the photosensitive device of FIG. 1 of the aforementioned U.S. patent application and that FIGS. 2b to g represent the evolution of the surface potential $\phi_S$ in the semiconductor substrate 4 at various times $t_1$ to $t_6$. In the embodiment of FIG. 2a, each photosensitive element is constituted by the combination of a photo-MOS, constituted by a photosensitive grid $G_0$, and a photodiode $D_{10}$. In the drawing, $G_2$–$G_5$ and $G_7$ are other electrodes, $D_2$–$D_6$ other n-type surface regions, $d_3$ a pt-type surface region and $V_1$–$V_5$ and $V_7$–$V_9$ the applied operating voltages whose roles are described in the above patent.

At time $t_1$ in FIG. 2b, the parasitic charges $Q_p$ on the conductive columns are transferred to the memory.

At time $t_2$ in FIG. 2c, the parasitic charges $Q_p$ are evacuated from the memory to the drain.

At time $t_3$ in FIG. 2d, there is no transfer, but the memory has completely evacuated the parasitic charges and can again store charges.

At time $t_4$ in FIG. 2e, there is a transfer to the memory of the signal charges $Q_S$ of a row which had previously been transferred to the columns. For this purpose, the row in question receives by means of the address register a potential equal to the reference potential of the device. The other photosensitive lines, as shown in dotted line form in FIG. 2e, continue to receive a polarization voltage $V_g$ and consequently continue to integrate charges.

At time $t_5$ in FIG. 2f, the signal charges $Q_S$ of the read row are transferred from the memory to the read register.

At time $t_6$ in FIG. 2g, charge transfer does not take place, but the memory has completely evacuated the signal charges and can again store charges.

In line or row transfer photosensitive devices and no matter what the variants made thereto, there is a periodic repetition of the two following sequences:
a first sequence corresponding to the transfer to the memory of the parasitic charges on the columns, before the arrival of the signal charges on said columns—time $t_1$ in FIG. 2b;
a second sequence corresponding to the transfer to the memory of the signal charges of a row on the columns—time $t_4$ in FIG. 2e.

In the time interval T between the end of a first sequence and the end of a second sequence, i.e. between times $t_2$ and $t_4$ in FIG. 2, there is an accumulation of parasitic charges on the columns and which are read at time $t_4$, at the same time as the signal charges. As has been stated, these charges are mainly due to the overflow of overilluminated photosensitive elements on the conductive column.

FIGS. 3a to c and 4a to d are diagrams illustrating two variants of the process according to the invention in the case of photosensitive elements formed, as in FIG. 2a, by the combination of a photo-MOS and a photodiode. Like FIGS. 2b to g, these Figs show the evolution of the surface potential in the substrate at various times, but significance has only been attached to what happens at the photosensitive elements, because there is no modification to the operation of the remainder of the device.

According to the invention, there is a temporary modification of the storage capacity of the photosensitive elements to enable them to store charges in time interval T, even if they are bloomed. Thus, during this interval, the photosensitive elements, even if they are overilluminated, do not overflow onto the columns.

In the variation of the process shown in FIGS. 3a to c, the storage capacity of the photosensitive elements is increased during time interval T. This increase in the storage capacity can be obtained by acting on the polarization voltage of the photosensitive elements. In the example of FIG. 2a, where the semiconductor substrate 4 is of type P, it is merely necessary to increase the polarization voltage $V_g$ applied to grids $G_o$ to increase the storage capacity of the photosensitive elements.

In FIG. 3a, at time $t_2$ indicating the start of interval T, the storage capacity of the photosensitive elements is increased by acting on the polarization voltage. The depth of the potential well for the photosensitive elements is then at level $V_M$, whilst it is at level V, below $V_M$ at time $t_1$.

This situation continues during interval T, i.e. at times $t_3$ and $t_4$, except for the photosensitive elements of the row, whose content is transferred from the columns into the memory at time $t_4$.

From the address register, the photosensitive elements of the row receive the reference potential of the device, as shown in FIG. 3b, where the situation of the other photosensitive elements is shown in dotted line form.

In FIG. 3c, at time $t_6$, the photosensitive elements reassume their normal storage capacity and the depth of the well returns to level V. There can then be an overflow of the charges on the columns. These excess charges will be evacuated to the drain during the following time $t_1$. During the time interval T, even if they are overilluminated, the photosensitive elements do not overflow onto the columns.

In the variant of the process shown in FIGS 4a to d, the storage capacity of the photosensitive elements is reduced during the evacuation of the parasitic charges from the conductive lines to the memory, followed by a return to the normal storage capacity of he photosensitive elements for the start of interval T.

In FIG. 4a, at time $t_1$, the storage capacity for the photosensitive elements is reduced. The level of the potential well passes from level V to the lower level $V_M$. This can be obtained by reducing the polarization voltage of grids $G_o$. It is merely necessary to reduce the storage capacity of the photosensitive elements for a short time. Thus, those elements which were already saturated or were on the point of being saturated, are freed from part of their charges, which is evacuated to the drain. Thus, all the photosensitive elements are ready to store new charges.

As from the start of interval T, i.e. at time $t_2$ in FIG. 4b, the normal storage capacity is given to the photosensitive elements. The potential well level passes from $V_m$ to V. During the time interval T, even if the photosensitive elements are bloomed, they are still ready to store a charge quantity equal to that which was evacuated by reducing the capacity at time $t_1$ and there is no parasitic charge overflow onto the columns.

At time $t_4$ in FIG. 4c, the elements of a row receive the reference voltage, so as to transfer their charges to the columns, whilst the other elements retain their normal storage capacity and the depth of their wells remains at level V, which is shown in dotted line form in FIG. 4c.

At time $t_6$ in FIG. 4d, all the photosensitive elements of the device reassume their normal storage capacity.

Thus, the process according to the invention makes it possible in a simple and effective manner to prevent any overflow of bloomed photosensitive elements during time interval T.

The process according to the invention applies in the manner described hereinbefore when the photosensitive elements are only constituted by photo-MOS and do not have photodiodes. As hereinbefore, the storage capacity of the photosensitive elements is modified by acting on the polarization voltage of the photo-MOS grids.

When the photosensitive elements are constituted by photodiodes, as shown in FIG. 5a, each photosensitive element has a photodiode $D_{10}$, integrated onto the type P semiconductor substrate 4. Beyond the photodiode $D_{10}$, there is the grid $G_1$. which is not exposed to the radiation and which receives a polarization voltage. Beyond the grid $G_1$, there is diode $D_1$ which is connected to the column conductor as before.

During the integration of the charges in the photodiodes, the polarization voltage of grid $G_1$ has a value $V_2$ equal e.g. to +1 V. Grid $G_1$ then insulates each photodiode from the diodes $D_1$ connected to the columns, as shown in dotted line form in FIG. 2b, where the increasing surface potentials are downwardly directed. In order to read the integrated charges in the photodiodes, the polarization voltage of grid $G_1$ assumes a value $V_1$, equal e.g. to 10 V and signal charges are transferred to diodes $D_1$.

FIG. 5c illustrates the variant of the process according to the invention corresponding to that shown in FIG. 3. At the start of the time interval T, the polarization voltage of grid $G_1$ assumes a value $V_3$ equal e.g. to 0.5 V and consequently below $V_2$, which increases the storage capacity of the photosensitive elements. As in the case of FIG. 3, this situation is continued during interval T, except for the photosensitive elements, whose content is transferred into the memory and for which the grid polarization voltage assumes the value $V_1$. When interval T is terminated, the polarization voltage reassumes value $V_2$.

FIG. 5d illustrates the variant of the process according to the invention corresponding to that shown in FIG. 4, said variant being easier to realise than that of FIG. 5c.

Before the start of interval T at time $t_1$, grid $G_1$ receives a polarization voltage $V_4$, equal e.g. to 2 V and consequently higher than $V_2$. Thus, the storage capacity of the photosensitive elements is reduced. As from the start of interval T, the normal storage capacity is given to the photosensitive elements, by giving the polarization voltage the value $V_2$.

What is claimed is:

1. A process for the analysis of a row transfer photosensitive device having a photosensitive area of M rows of N photosensitive photo-MOS, elements, each having a grid and controlled by means of a polarization voltage applied to the grid, corresponding photosensitive elements of the different rows being connected in parallel by conductive columns to a memory, said memory periodically transferring to a read register signal charges on the columns after transfer from the photosensitive elements in a chosen row, and also transferring to an evacuation drain parasitic charges which are on the columns before the signal charges arrive from the photosensitive elements, wherein the process consists of temporarily modifying the storage capacity of the photosensitive elements in the chosen row by either reducing or increasing the polarization voltage of the grids in the time interval beginning after the evacuation of parasitic charges of the conductive columns to the memory and ending with transfer of the signal charges of the photosensitive elements in the chosen row from columns to the memory so that the photosensitive elements can store charges during said time interval.

2. A process for the analysis of a row transfer photosensitive device having a photosensitive area of M rows of N photosensitive elements constituted by a photo-MOS each having a grid (Go) and controlled by means of a polarization voltage applied to the grid and each having a photodiode, corresponding photosensitive elements of the different rows being connected in parallel by conductive columns to a memory, which periodically ensures the transfer to a read register of signal charges on the columns after transfer from the photosensitive elements in a chosen row and which ensures the transfer to an evacuation drain of parasitic charges on the columns before the signal charges arrive from the photosensitive elements in the chosen row, wherein the process consists of temporarily modifying the storage capacity of the photosensitive elements in the chosen row by either reducing or increasing the polarization voltage of the grids in the time interval starting after the evacuation of the parasitic charges of the conductive columns to the memory and finishing by the transfer of the signal charges of the photosensitive elements in the chosen row from columns to the memory so that the photosensitive elements can store charges during said time interval.

3. A process for the analysis of a row transfer photosensitive device having a photosensitive area of M rows of N photosensitive elements constituted by photodiodes, and a grid to which is applied a polarization voltage controlling the transfer of charges between each photodiode and the column corresponding photosensitive elements of the different rows being connected in parallel by conductive columns to a memory, which periodically ensures the transfer to a read register of signal charges on the columns after transfer from the photosensitive elements in a chosen row and which ensures the transfer to an evacuation drain of parasitic charges on the columns before the signal charges arrive from the photosensitive elements in the chosen row, wherein the process consists of temporarily modifying the storage capacity of the photosensitive elements in the chosen row by either reducing or increasing the polarization voltage of grids (Go), which voltage controls the transfer of charges between the photodiodes and the columns, in the time interval starting after the evacuation of the parasitic charges of the conductive columns to the memory and finishing by the transfer of the signal charges of the photosensitive elements in the chosen row from columns to the memory, so that the photosensitive elements can store charges during said time interval.

4. A process according to one of claims 1, 2, or 3, wherein the storage capacity of the photosensitive elements is increased during said time interval.

5. A process according to one of claims 1, 2, or 3, wherein the storage capacity of the photosensitive elements is reduced during the evacuation of the parasitic charges of the conductive columns to the memory for transfer to the drain and the normal storage capacity for the photosensitive elements is restored for the start of said time interval.

* * * * *